INVENTORS
Robert J. Lang, Robert B. Long,
Carl E. Heath and Robert M. Skomoroski
BY Henry Berk
ATTORNEY

United States Patent Office 2,981,747
Patented Apr. 25, 1961

2,981,747
PROCESS AND APPARATUS FOR PARTIAL OXIDATION OF ORGANIC COMPOUNDS

Robert J. Lang, Metuchen, Robert B. Long, Wanamassa, Monmouth County, Carl E. Heath, Nixon, and Robert M. Skomoroski, Elizabeth, N.J., assignors to Esso Research and Engineering Company, a corporation of Delaware Filed Aug. 15, 1958, Ser. No. 755,184
22 Claims. (Cl. 260—451)

The invention relates to a process and an apparatus hereinafter referred to as the homogeneous reactor for accomplishing controlled reactions of fluid reactants where close control over reaction time and temperature is necessary to obtain satisfactory product distributions and achieve adequate conversions.

The invention makes possible a rapid mixing of reactants, intermediates and products to form a homogeneous reaction mixture, a control of reaction temperature effected, at least partially, by back mixing with fresh reactants, and a rapid withdrawal of products for quenching before they degrade.

One object of the invention is to provide an improved process and apparatus for producing valuable chemicals by the vapor phase oxidation of $C_1$ to $C_{25}$ organic compounds.

Other objects will be apparent from the detailed descriptions of the processes and apparatus hereinafter set forth.

The reactor of this invention provides an effective means for the controlled oxidation of gasified hydrocarbons where substantial amounts of oxygen are used to make oxygenated compounds. For purposes of illustration, the invention will be described as it is employed for this purpose, it being understood that in any specific application of the invention the conditions of operation will vary according to the feed employed and the end products to which the process is directed.

The oxidation of hydrocarbons is a highly exothermic reaction which proceeds by way of a complex, free radical type of mechanism. Careful control of reaction temperature is extremely important to the successful operation of a partial oxidation process. The temperature must be maintained well within the cool flame region and at the level required for proper selectivity. The reaction goes through three distinct stages: (1) an induction period in which peroxide type compounds are formed by direct oxygen attack on the hydrocarbon feed. These peroxide type compounds are the active intermediates and initiators for stage (2) consisting of rapid, chain branching type reactions in which oxygenated and olefinic compounds of equal and lower carbon chain length than the feed are formed; and (3) ignition, or combustion, in which all of the intermediate oxidation products are degraded to carbon dioxide and water.

To carry out a useful oxidation process, the reaction must be arrested in the second or "partial" oxidation stage. A quick and thorough mixing of the reactants is required to prevent the formation of localized hot spots in which the reaction could proceed to completion. Energy released in the partial oxidation of a hydrocarbon molecule will accelerate its further oxidation unless it is quickly dissipated. It is, therefore, of vital importance that the time of reaction be limited as nearly as possible to the minimum time necessary to achieve the desired conversion.

Various methods and means have been devised in the past for employment with partial oxidation. Among these is the "open tube" reactor wherein temperature control is obtained by the use of large diluent volumes with relatively small conversions per pass. A more recent improvement in this art was the "raining solids" reactor which makes use of a fine rain of inert solids falling down through the reaction zone, picking up the heat liberated in the reaction and carrying it out of the reaction zone.

In the reactor of this invention the control of the oxidation reaction is accomplished by continually back mixing and quenching the reacting mass with relatively cool incoming reactants while simultaneously removing reaction products from the reaction zone for final quenching. The cooler incoming reactants are, in turn, activated, react, and repeat the cycle. The reaction may be further controlled by injecting fine sprays of water or an inert liquid or gaseous coolant directly into the reaction zone.

The major advantages of this type of reactor are its extreme mechanical simplicity, short residence time, i.e., about 0.01 to 10 seconds, and correspondingly high capacity. The homogeneous reactor also offers certain advantages in quenching, adiabatic operation and product selection.

In contrast to the raining solids reactor, the homogeneous reactor operates without solids flow. A preheated oxidant, e.g. air or molecular oxygen, and hydrocarbons are premixed, and fed into the reaction chamber of a reaction vessel at very high velocities, i.e., a linear gas velocity of about 10 to 5000 ft./second, through a series of tubular conduits which are preferably nozzles or quills projecting into the reaction chamber and having a plurality of orifices. In the preferred embodiment of this reactor the oxidant and hydrocarbons are mixed in a mixing chamber by the action of hydrocarbon jets impinging into the oxidant stream. The reaction may be initiated by preheating the reaction vessel by a conventional heating means, e.g. by introducing a spark or a small hydrogen flame into the reaction chamber or heating the walls of the reaction chamber by electrical resistance means. When a reaction initiator substance such as ozone or ditertiary butyl peroxide is employed preheating of the reaction vessel is not required. If this method is used, the initiator may be introduced directly into the reaction chamber to contact the incoming preheated reactants. Once the reaction has been started it is possible to drop the temperaure far below the autoignition temperature of the reactants and still maintain the reaction because of the intense mixing. For example, to carry out an oxidation reaction in the homogeneous reactor at a reaction temperature of 700° F. the feed is initially preheated to about 525° F. and once the reaction is initiated the temperature of the preheated feed is reduced to about 400° F. The reaction vessel may be a relatively small housing having a curved or polygonal internal surface that will permit the gaseous reactants to swirl in a generally circular cocurrent motion. The reactor operates most efficiently when the conduits are so positioned as to cocurrently discharge the streams of gaseous mixture tangentially to the path of the swirling mixture to impart to said mixture the desired constantly swirling motion. The gases swirl past each nozzle orifice and are continually mixed with the cooler fresh reactants which tend to serve as a brake on the reaction. Additional tubular nozzles or coolant conduits having a plurality of orifices may be used to release a spray of water or an inert liquid or gaseous coolant directly into the reaction chamber to aid in temperature control or the reaction vessel itself may be immersed in a coolant.

Exit means are provided through which the products of reaction are continuously removed from the reaction vessel by virtue of the pressure drop across the reactor.

In a reactor of the type just described certain opposing forces must be recognized and controlled. To obtain the desired short residence times and at the same time provide adequate back mixing to self perpetuate and control the reaction, definite relationships must be maintained between the location of reactant inlets, movements of the reactants in the reaction chamber and the location of exit means. A criticality, therefore, exists in properly positioning the reactant inlets and the exit means. If, for instance, the exit means be located too close to the wall surface first contacted by reactants leaving the reactant inlets, low residence times may be maintained but adequate back mixing will not be accomplished. If, on the other hand, positioning of the exit means allows for excessive back mixing before product evacuation, the residence time increases with the resulting loss of product selectivity to the more valuable reaction products. The exit means in the homogeneous reactor is, therefore, centrally positioned in relation to a surface other than the concave surface first contacted by reactants leaving the reactant inlets. The reactant inlets are spaced away from both the aforesaid concave surface and the exit means and positioned so as to substantially circumscribe the exit means and/or a major axis thereof. In the preferred embodiment of the reactor, the products are removed via a tubular exit means positioned in accordance with the foregoing and which communicates with the central portion of the reaction chamber into which the reactants and reaction products spiral toward a vortex before leaving via the exit means. Thus, in the embodiment shown in Figure 1 of the accompanying drawing wherein a reaction chamber is shown enclosed by a first wall, a second wall from which inlet conduits project and a concave wall extending from said first wall to said second wall, the exit means may be centrally positioned in relation to said first wall so as to communicate with the reaction chamber through said first wall, and spaced from and centrally positioned in relation to said second wall. The exit means thus has a major axis extending through the reaction chamber with the aforesaid concave wall encompassing such axis.

If it be desired to effectuate quenching before the products leave the reactor, additional conduits may be positioned to communicate with the aforesaid tubular exit means. Through these quench conduits may be introduced water or any suitable quenching liquid or gas. In another embodiment of the reactor a cooling surface, such as a water cooled probe or bayonet cooler, is positioned to project through the aforesaid tubular exit means and into the reaction vessel. When this cooling means is employed, the products of reaction impinge upon the cooler surface and undergo a reduction in temperature before leaving the reactor.

If the quenching of the reaction is to occur outside the reactor, any conventional quenching means may be employed or a second homogeneous reactor may be connected in a series with the first reactor in order to cool the reaction gases at an extremely high rate by rapid mixing with a cool inert gas. It has also been found that low molecular weight alcohols, e.g. $C_1$ to $C_3$, are effective in quenching the oxidation of hydrocarbons.

The flow of reaction products toward the vortex of the swirling reactants and hence into position to exit from the reactor may be regulated by a perforated hollow cylinder centrally positioned in the reaction vessel so as to communicate with the aforesaid exit means. Louvers, baffles or any suitable flow regulating means may be used in addition to or in place of the perforated cylinder.

The reaction time is controlled by the rate of throughput. The degree of conversion per pass, the amount of preheating involved, the use of initiators such as ozone and the employment of extraneous coolants all can affect the temperature. Pressure is controlled by throttling or exhausting the exit line. For a given oxidant/hydrocarbon ratio, an optimum time-temperature-pressure combination may be selected to give high oxygen utilization per pass while minimizing the formation of carbon oxides and water. After the reaction is initiated less preheating is necessary. At low conversions the reaction temperature can be controlled by feed temperature, with the heat of reaction being dissipated in heating the fresh feed to reaction temperature. At high conversions, temperature is controlled by atomizing a liquid coolant into the reaction vessel. Some examples of suitable coolants are: naphthalene, methyl naphthalene, polymethyl naphthalenes, phenanthrene, polymethyl benzenes, and water. The choice of coolant is dictated by the pressure-temperature combination desired. In some cases it may prove advantageous to cool and recycle a portion of the effluent from the reactor for use as a coolant. If desired, a portion of the hydrocarbon feed may be injected directly into the reaction vessel separately from the premixed feed.

Thus, in the homogeneous reactor, low tmperatures are easily obtained by starting the reaction off at low temperatures and long residence times, i.e. 1 to 10 seconds. As soon as the oxidation starts the residence time is decreased to the desired level, e.g. ranges from about 0.05 to 3.0 seconds have been found suitable when oxidizing hexane with the range of 0.6 to 2.0 seconds preferred. By this method the reaction temperature has been dropped to and held at about 650° F. which is comparable to the lowest temperatures achieved in the raining solids reactor. By using small amounts of ozone as an initiator and molecular oxygen as the oxidant reaction temperatures of as low as 520° F. have been maintained.

The invention and its objectives may be more fully understood from the following description when read in conjunction with the accompanying drawings, in which.

Figure 1:
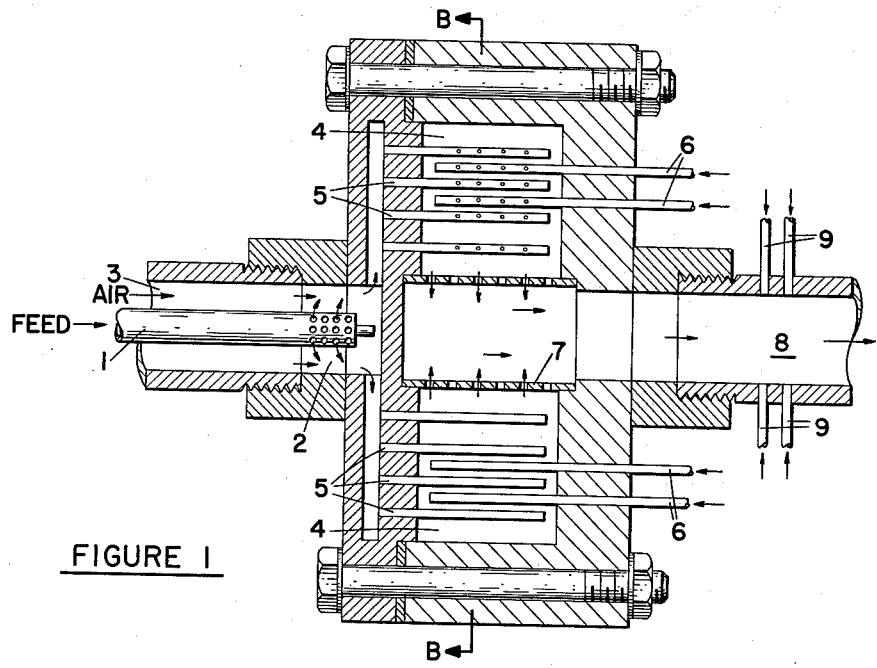
Figure 1 is a sectional view of one embodiment of an apparatus of the character contemplated taken along the line A—A of Figure 2.
Figure 2:
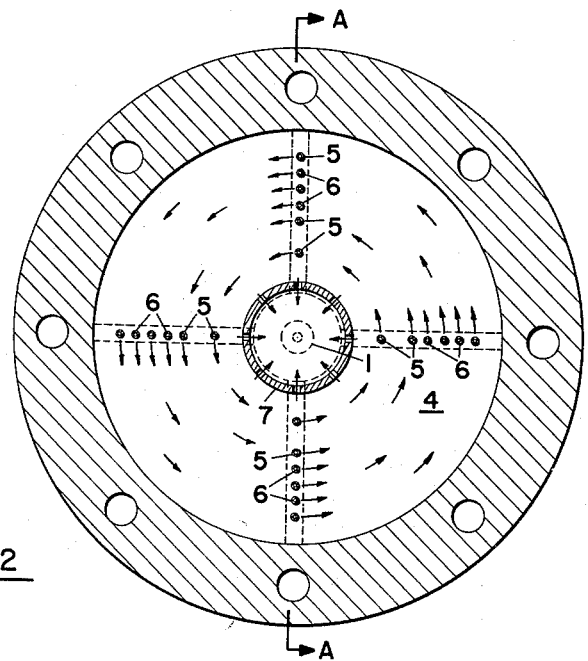
Figure 2 is a sectional view taken along the line B—B of Figure 1.

When the reactor is employed for the partial oxidation of hydrocarbons, the process is initiated by introducing a hydrocarbon feed preheated to about 300° to 800° F. into a mixing chamber 2 via a perforated tube 1. Any means suitable for injecting a large number of small streams of hydrocarbon gases into the mixing zone may be substituted for the perforated tube. The gaseous hydrocarbons are forced from tube 1 in jet-like streams to impinge upon a stream of air preheated to about 65 to 900° F. entering mixing chamber 2 via air inlet 3. The mixed gaseous feed then passes into a series of multi-orificed nozzles 5 projecting into the reaction chamber 4. The openings in the nozzles are so positioned as to cocurrently discharge streams of the gaseous mixture tangentially to the intended path of the mixture to impart to such mixture a constantly swirling motion. Once the reaction is initiated the temperature of the incoming feed preheated to within the range of about 300° F. to about 800° F. is reduced to a range of about 250° F. to about 700° F. and residence time is reduced from a range of 1 to 10 seconds to a range of about 0.05 to 3 seconds. The hot swirling reactants continually swirl past the nozzles 5 and are continuously mixed with the cooler incoming reactants. When additional cooling is desired, fine sprays of water or an inert liquid or gaseous coolant may be introduced to reaction chamber 4 via multi-orificed cooling nozzles 6 which also may be used to introduce a liquid or gaseous catalyst or to inject hydrocarbon feed directly into a portion of reaction chamber 4. A perforated cylinder 7 is centrally positioned in reaction chamber 4 to regulate the flow of reaction products leaving the reactor via an exit tube 8. Quenching inlet conduits 9 are provided for introducing water or other liquid or gaseous quenching means into exit tube 8 if it be desired to initiate quenching before the products of reaction leave the reactor. Otherwise, products leaving the reactor via exit tube 8 may then pass to a suitable product quench. The reactor may be operated with pressures of about 0 to 2000 p.s.i.g., preferably 5 to 800 p.s.i.g. in the reaction chamber. However, for proper mixing and throughput, feed should be introduced under a pressure of at least 5 p.s.i.g. Scaling of the reactor to allow for high pressure operation can easily be carried out because of the extreme simplicity of design.

EXAMPLE I

In a continuous process, n-hexane was fed into a homogeneous reactor such as that shown in the drawing with air employed as the oxidant. A large number of tests were made wherein the residence time, the operating pressure, the oxygen/hydrocarbon ratio, the feed temperature and the temperature of reaction were varied. The resulting products from these tests were analyzed and the following data were compiled.

Epoxides can be readily formed with high reaction rates in a non-catalytic oxidation of hydrocarbons. Low temperatures and short residence times have been demonstrated to be most effective for obtaining these products. At higher temperatures, chain fissure of the intermediates is favored over the internal radical isomerization reaction believed to be responsible for epoxide or ketone formation. Thus, olefins and light aldehydes are selectively produced. Furthermore, the epoxides are readily attacked by oxygen to give less valuable products. Thus, the epoxides should be rapidly removed from the reaction as soon as they are formed.

The homogeneous reactor is ideally suited for oxidation to this class of products.

EXAMPLE II

A further test was made of the homogeneous reactor to determine the effect of its low residence times on the selectivity to epoxides. Hexane and air were fed to a homogeneous reactor such as that shown in the drawing. The reactor was operated at atmospheric pressure with a residence time after initiation of 0.7 second. The temperature of reaction was maintained at about 700° F. The products of this reaction were analyzed and compared with the corresponding results of oxidation with a raining solids reactor operating at the same temperature and pressure, but with a typical raining solids residence time, i.e. 5.3 seconds. The comparative data appears in the following table:

Table II

| Product | Selectivity, wt. percent on Liquid Products [1] | |
|---|---|---|
| | Homogeneous Reactor | Raining Solids Reactor |
| Formaldehyde | 2 | 14 |
| $C_2/C_4$ Aldehydes | 25 | 22 |
| Alcohols | 2 | 3 |
| Acids | 5 | 3 |
| $C_6$ Epoxides | 42 | 27 |
| $C_4/C_6$ Olefins | 24 | 31 |

[1] Hydrocarbon conversion—30 wt. percent on feed.

EXAMPLE III

Additional tests were made as in Example II while operating the homogeneous reactor at various residence times. The results were again compared with results from a raining solids reactor operating at a residence time of 5.3 seconds. The data obtained are contained in Table III.

Table I
OPERATING DATA HOMOGENEOUS REACTOR

| Test No | 1 | 2 | 3 | 4 | 5 | 6 | 7 | 8 | 9 | 10 |
|---|---|---|---|---|---|---|---|---|---|---|
| Operating Conditions: | | | | | | | | | | |
| Hydrocarbon Feed | n-Hexane | n-Hexane | n-Hexane | n-Hexane | n-Hexane | n-Hexane | n-Hexane | n-Hexane | n-Hexane | n-Hexane |
| Oxidant | Air | Air | Air | Air | Air | Air | Air | Air | Air | Air |
| Oxygen/Hydrocarbon ratio | 1.08 | 0.75 | 0.76 | 0.76 | 0.77 | 0.72 | 0.73 | 0.71 | 0.71 | 0.72 |
| Reaction Temperature, °F | 799 | 667 | 685 | 665 | 691 | 711 | 739 | 700 | 701 | 703 |
| Residence Times, Secs | 0.10 | 2.0 | 0.76 | 0.65 | 0.64 | 0.62 | 0.18 | 2.0 | 0.98 | 0.59 |
| Operating Pressure, p.s.i.g | 3.0 | 0 | 0 | 0 | 2.0 | 2.0 | 3.0 | 1.2 | 2.5 | 3.0 |
| Hydrocarbon Feed Temp., °F | 475 | 365 | 397 | 459 | 429 | 393 | 447 | 336 | 367 | 370 |
| Premixed Feed Temp., °F | 520 | 294 | 413 | 459 | 396 | 405 | 500 | 296 | 357 | 358 |
| Duration of Test, Min | 20 | 80 | 162 | 90 | 80 | 82 | 105 | 155 | 125 | 42 |
| Charge Data, Total Feed: | | | | | | | | | | |
| Hydrocarbon, gms | 450 | 158 | 980 | 541 | 473 | 518 | 2,072 | 315 | 507 | 282 |
| Oxygen, gms | 181 | 44 | 275 | 153 | 136 | 139 | 564 | 83 | 134 | 75 |
| Water, gms | 53 | | | | | | | | | |
| Conversion Data: | | | | | | | | | | |
| Feed Conversion | 27.5 | 40.7 | 37.9 | 33.2 | 38.0 | 39.5 | 35.7 | 40.7 | 37.3 | 37.1 |
| Oxygen Conversion | 23.3 | 81.9 | 73.0 | 72.5 | 69.9 | 63.6 | 43.1 | 67.6 | 78.7 | 65.4 |
| Product Data, Weight by Phase: | | | | | | | | | | |
| Hydrocarbon Layer, gms | 310 | 111 | 657 | 382 | 310 | 324 | 1,489 | 197 | 349 | 177 |
| Water Layer, gms | 84 | 31 | 179 | 103 | 101 | 90 | 284 | 44 | 78 | 52 |
| C+H+O in Gas, gms | 277 | 35 | 310 | 166 | 225 | 198 | 376 | 118 | 144 | 113 |
| Total | 671 | 177 | 1,146 | 651 | 636 | 612 | 2,149 | 359 | 571 | 342 |
| Tail Gas, s.c.f | 25.79 | 6.19 | 37.37 | 15.72 | 19.92 | 20.35 | 77.77 | 14.31 | 17.54 | 11.73 |
| Material Balance, percent | 97 | 88 | 91 | 95 | 104 | 93 | 85 | 90 | 89 | 96 |
| Selectivity to Major Products, #/# Feed Reacted: | | | | | | | | | | |
| $C_1/C_3$ Aldehydes | 0.128 | 0.0859 | 0.102 | 0.120 | 0.133 | 0.101 | 0.106 | 0.091 | 0.0935 | 0.126 |
| $C_3/C_4$ Aldehydes | 0.0872 | 0.0416 | 0.0632 | 0.0706 | 0.0583 | 0.0647 | 0.0549 | 0.070 | 0.0685 | 0.0553 |
| Epoxides | 0.284 | 0.225 | 0.270 | 0.298 | 0.260 | 0.240 | 0.255 | 0.185 | 0.292 | 0.301 |
| Olefins (HC Layer) | 0.205 | 0.146 | 0.147 | 0.184 | 0.165 | 0.160 | 0.169 | 0.161 | 0.187 | 0.163 |
| Formaldehyde | 0.0471 | 0.0235 | 0.0324 | 0.0243 | 0.0154 | 0.00191 | 0.0168 | 0.0145 | 0.00482 | 0.0175 |
| Acid | 0.0189 | 0.0126 | 0.0135 | 0.0345 | 0.0255 | 0.0171 | 0.0120 | 0.0137 | 0.0117 | 0.0150 |
| Alcohol | 0.0156 | 0.0105 | 0.0126 | 0.0147 | 0.0163 | 0.0124 | 0.0130 | 0.0111 | 0.0115 | 0.0154 |
| $H_2O$ | 0.0372 | 0.329 | 0.293 | 0.334 | 0.315 | 0.253 | 0.223 | 0.176 | 0.218 | 0.281 |
| Carbon Monoxide | 0.103 | 0.0884 | 0.0874 | 0.0388 | 0.0926 | 0.0727 | 0.00619 | 0.0916 | 0.074 | 0.0851 |
| Carbon Dioxide | 0.101 | 0.113 | 0.0874 | 0.0598 | 0.0930 | 0.0838 | 0.00572 | 0.104 | 0.0756 | 0.0853 |
| Ethylene | 0.0336 | 0.0292 | 0.0303 | 0.0256 | 0.0321 | 0.00288 | 0.0453 | 0.0346 | 0.0381 | |
| Propylene | 0.126 | 0.0338 | 0.0693 | 0.080 | 0.174 | 0.0830 | 0.00971 | 0.0942 | 0.0854 | 0.106 |

Table III

| Reactor | Residence Time in Seconds | Total Liquid Oxygenated Products | $C_6$ Epoxides | Carbon Oxides |
|---|---|---|---|---|
| Homogeneous | 0.6 | 68 | 31 | 10 |
| | 1.0 | 61 | 29 | 15 |
| | 2.0 | 55 | 25 | 17 |
| Raining Solids | 5.3 | 55 | 25 | 17 |

EXAMPLE IV

Hexane was continuously fed to the homogeneous reactor and molecular oxygen was substituted for air as the oxidant. Tests were made using oxygen as the oxidant with small quantities of ozone added to initiate the reaction. The tests were made with the same feed conversion and the same mole ratio of oxygen to n-hexane to determine the effect, if any, upon the temperature of reaction. The data obtained are contained in Table IV.

*Table IV*

| Initiator | Initiator Conc., Vol. Percent of Feed | Temperature of Reaction, °F. | Lbs. of Liquid Oxygenated Compounds/ Lb. n-Hexane Converted |
|---|---|---|---|
| None | 0 | 800 | 0.62 |
| Ozone | 0.15 | 520 | 1.04 |

EXAMPLE V

Additional tests were conducted as in Example IV to determine the effect of a decrease in the temperature of reaction on the yield of olefins in the oxidation reaction. The results of those tests are contained in Table V.

*Table V*

| Reaction Temperature, °F. | Lbs. Liquid Phase Olefins/ Lb. n-Hexane Converted |
|---|---|
| 800 | 0.217 |
| 725 | 0.18 |
| 520 | 0.000 |

EXAMPLE VI

A test was made of the homogeneous reactor using 3-methylpentane as the hydrocarbon and air as the oxidant.

In another test a light virgin naphtha having a boiling range of 115° to 200° F. (vapor temperature) was used as the hydrocarbon feed with air as the oxidant.

The operating conditions used and the selectivities to the various reaction products are shown in Table VI.

*Table VI*

| Test No. | 1 | 2 |
|---|---|---|
| Operating Conditions: | | |
| Hydrocarbon feed | (1) | (2) |
| Oxidant | air | air |
| Oxygen/HC ratio | 0.76 | 0.7 |
| Reaction Temp., °F. | 765 | 758 |
| Residence Times, Secs. | 0.2 | 0.2 |
| Operating pressure, p.s.i.g. | 0 | 3 |
| Hydrocarbon Feed Temp., °F. | 551 | 504 |
| Premixed Feed Temp., °F. | 538 | 535 |
| Duration of Test, Min. | 120 | 250 |
| Charge Data, Total Feed: | | |
| Hydrocarbon | 2,280 | 4,400 |
| Oxygen, gms. | 644 | 1,346 |
| Water, gms. | | |
| Conversion Data: | | |
| Feed Conversion | 21.7 | 37 |
| Oxygen Conversion | 77.7 | 75 |
| Product Data, Weight by Phase: | | |
| Hydrocarbon Layer, gms. | 1,723 | 3,340 |
| Water Layer, gms. | 159 | 479 |
| C+H+O in Gas, gms. | 419 | 1,927 |
| Total | 2,301 | 5,746 |
| Tail Gas, s.c.f. | 25.6 | 39.0 |
| Material Balance, percent | 79 | 100 |
| Selectivity to Major Products #/# Feed Reacted | (1) | (3) |
| $C_1/C_2$ Aldehydes | 0.054 | 0.166 |
| $C_3/C_4$ Aldehydes | 0.029 | 0.017 |
| Epoxides | 0.275 | 0.337 |
| Olefins (HC Layer) | 0.208 | 0.178 |
| Formaldehyde | 0.026 | (4) |
| Acid | 0.010 | 0.030 |
| Alcohol | 0.006 | 0.021 |
| Water | 0.204 | 0.335 |
| Carbon Monoxide | 0.040 | 0.105 |
| Carbon Dioxide | 0.022 | 0.047 |
| Ethylene | (4) | 0.021 |
| Propylene | (4) | 0.037 |

1 3-methyl pentane.
2 Light virgin naphtha (boiling range (115-200° FVT)).
3 Light virgin naphtha.
4 Not determined.

EXAMPLE VII 1-chloroheptane is oxidized in the homogeneous reactor using air as the oxidant. The reaction temperature is controlled at 600–800° F. and the residence time is kept between 0.5–2.0 seconds. The pressure in the reaction vessel is 1 atmosphere and the oxygen/chloroheptane mole ratio is between 0.3 to 1.0. The partial oxidation products include oxy-chloroheptanes, aldehydes, some alcohols, $C_2$ to $C_7$ olefins and hydrochloric acid.

EXAMPLE VIII 2-heptanone is fed to the homogeneous reactor using oxygen as the oxidant. n-Hexanol is fed to the homogeneous reactor using air as the oxidant. The conditions that are employed and some of the products that are derived are listed below.

| Feed | 2-Heptanone | n-Hexanol |
|---|---|---|
| Oxidant | Oxygen | Air |
| Reaction Temp., °F. | 600–800 | 600–800 |
| Residence Time, Secs. | 0.5–2.0 | 0.5–2.0 |
| Oxidant/Feed, mole ratio | 0.3–1.0 | 0.3–1.0 |
| Products | $CO$, $CO_2$, $C_2$–$C_4$ olefins, alcohols, $C_1$ mainly $C_1$–$C_5$ aldehydes and ketones. | $CO$, $CO_2$, $C_2$–$C_6$ olefins, $C_1$–$C_2$ alcohols, $C_1$–$C_6$ aldehydes $C_5$+epoxides. |

EXAMPLE IX

Isopropyl benzene is fed to the homogeneous reactor using air as the oxidant. The conditions that are employed and some of the products that are derived are listed below.

Feed ------------------- Isopropyl benzene.
Oxidant ----------------- Air.
Reaction temp., °F. ----- 700–800.
Residence time, secs. --- 0.5–2.0.
Oxidant/feed, mole ratio -- 0.7–1.2.
Products ---------------- $CO$, $CO_2$, $C_2$–$C_6$ olefins, benzene, benzaldehyde, acetophenone, styrene, alpha-methyl styrene.

It is difficult to partially oxidize aromatic hydrocarbons. In the past it has been found that temperatures above 1000° F. are generally needed to start the reaction. If the reaction does occur at these temperatures, the main products are carbon oxides and water. With the homogeneous reactor this initiation temperature can be greatly reduced. With the addition of about 1 vol. percent of ozone the initiation temperature may be reduced several hundred degrees making it possible to operate at much lower temperatures and valuable oxygenated compounds may be obtained with a much lower concomitant production of the relatively worthless carbon oxides and water.

The quick and thorough mixing provided makes the homogeneous reactor suitable for many varied and different processes.

This type of operation can be advantageously used for thermal cracking or steam cracking of hydrocarbons. The feeds to the reactor are preheated and fed through the reactor under carefully controlled temperature and time conditions. The high free radical concentration which can build up in the homogeneous reactor due to the mixing of feed and product allows much higher cracking rates to be obtained. Furthermore, the homogeneous nature of the reaction allows free radical reaction modifiers to be more effective.

The homogeneous reactor may be used as a gas absorber or stripper for liquid solutions of gases. It is preferred to feed the liquid to the nozzles with gas in the body of the reactor for absorption with just the opposite operations for stripping. The addition of an additional disengaging chamber will allow the effluent liquid and gas to be continuously withdrawn separately.

Because of the excellent contact between the two phases afforded by the homogeneous reactor, vapor-liquid equilibrium will be more closely approached than in conventional absorbing or stripping columns, and at a considerably faster rate. Thus, volumetric throughputs much higher than conventional columns can be attained along with improved mass transfer efficiencies. Thus, the reactor can be used to strip dilute gas or relatively insoluble gases, for example, carbon dioxide, $H_2S$, $SO_2$, etc., for which conventional stripping columns have low efficiencies. A typical refinery application of homogeneous reactor in absorption is for olefins under pressure in gas oil.

These same qualities also make the homogeneous reactor suitable for use as a liquid-liquid extractor. Solvents and solutions may be continuously fed to the unit. The well-mixed liquid will pass through a draw-off line to a settler, allowing extract and raffinate to be continuously collected. Considerable investment, operating and maintenance savings can be realized for such systems as caustic treating of naphtha and heating oil sweetening operations using water solutions and $SO_2$ or $NH_3$ extraction.

The terms "oxygenated products" and "oxygenated compounds" are used herein to designate oxygen substituted hydrocarbons containing and consisting solely of carbon, hydrogen and oxygen atoms, e.g. ketones, epoxides, aldehydes and carboxylic acids.

What is claimed is:

1. An apparatus for conducting controlled reactions of fluid reactants which comprises a reaction vessel having a reaction chamber enclosed by a concave wall and at least one other wall, multiple reactant inlets, and an exit means, said concave wall encompassing said exit means, said exit means being centrally positioned in relation to said other wall and communicating with said reaction chamber, said reactant inlets communicating with said reaction chamber at positions spaced from said concave wall which are also spaced from and substantially circumscribe a major axis of said exit means, and which are aligned to impart to fluid reactants issuing therefrom into said reaction chamber a cocurrent swirling motion, whereby reactants enter said reaction chamber, swirl past said reactant inlets and toward said exit means while reacting and are continuously admixed with incoming reactants before leaving said reaction chamber.

2. An apparatus according to claim 1 wherein said reactant inlets are tubular nozzles having a plurality of orifices.

3. An apparatus for conducting controlled reactions of fluid reactants which comprises a reaction vessel having a first wall, a second wall and a concave wall extending from said first wall to said second wall, said walls enclosing a substantially cylindrical reaction chamber, extending into said reaction chamber multiple reactant conduits having a plurality of orifices aligned to impart to fluid reactants issuing therefrom a cocurrent swirling motion about a major axis of said reaction chamber extending through said first wall and said second wall, an exit means communicating with said reaction chamber and encompassing said major axis, said orifices communicating with said reaction chamber at positions between said concave wall and said exit means.

4. An apparatus for conducting controlled reactions of fluid reactants which comprises a reaction vessel having a reaction chamber enclosed by a concave wall and at least one other wall, multiple reactant inlets and an exit means, said concave wall encompassing said exit means, said exit means being centrally positioned in relation to said other wall and communicating with said reaction chamber, said reactant inlets extending through said other wall, substantially circumscribing a major axis of said exit means, communicating with said reaction chamber at positions spaced from said concave wall and said exit means and aligned to impart unidirectional swirling to fluid reactants issuing therefrom into said reaction chamber, whereby reactants enter said reaction chamber, swirl past said reactant inlets and toward said exit means.

5. An apparatus for conducting controlled reactions of fluid reactants which comprises a reaction vessel having a reaction chamber enclosed by a first wall, a second wall and a concave wall extending from said first wall to said second wall, an exit means, and multiple reactant inlet conduits encompassing a major axis of said exit means, said exit means being centrally positioned in relation to said first wall, spaced from and centrally positioned in relation to said second wall, and communicating with said reaction chamber, said concave wall encompassing said major axis, said inlet conduits projecting from said second wall into said reaction chamber at positions spaced from said exit means and said concave wall and aligned so as to impart to fluid reactants issuing from said inlets a cocurrent swirling motion, whereby fluid reactants enter said chamber, swirl past said reactant inlets and toward said exit means.

6. An apparatus for conducting controlled reactions of fluid reactants which comprises a reaction vessel having a reaction chamber enclosed by a concave wall and at least one other wall, an exit means having a major axis extending through said reaction chamber and said other wall, and multiple inlet conduits extending into said chamber in parallel relationship with said major axis, said concave wall encompassing said major axis, said exit means being centrally positioned in relation to said other wall and communicating with said reaction chamber, said reactant inlets embracing said major axis, communicating with said reaction chamber at positions intermediate to said concave wall and said exit means and positioned to discharge fluid reactants issuing therefrom into said reaction chamber in a direction tangent to said concave wall and to establish in said chamber a unidirectional swirling movement of said reactants whereby reactants enter said reaction chamber, swirl past said inlet conduits and toward said exit means.

7. An apparatus for conducting controlled reactions of fluid reactants which comprises a reaction vessel having a reaction chamber enclosed by a first wall, a second wall and a concave wall extending from said first wall to said second wall, an exit means, multiple reactant inlet conduits encompassing a major axis of said exit means, and multiple coolant inlets extending through said first wall, said exit means being centrally positioned in relation to said first wall, spaced from and centrally positioned in relation to said second wall, and communicating with said reaction chamber, said concave wall encompassing said major axis, said conduits passing through said second wall into said reaction chamber at positions intermediate said exit means and said concave wall, each of said conduits having at least one orifice positioned therein so as to impart to fluid reactants issuing from said inlets a cocurrent swirling motion, whereby reactants enter said reaction chamber, swirl past said conduits and toward said exit means.

8. An apparatus for conducting controlled reactions of fluid reactants which comprises a reaction vessel having a reaction chamber enclosed by a first wall, a second wall and a concave wall extending from said first wall to said second wall, an exit means centrally positioned in relation to said first wall, spaced from and centrally positioned in relation to said second wall, communicating with said reaction chamber through said first wall and having a major axis extending through said reaction chamber, and multiple inlet conduits projecting from said second wall into said reaction chamber in parallel relationship with and embracing said major axis, said concave wall encompassing said major axis, each of said conduits having at least one orifice positioned so that fluid reactants issuing therefrom into said reaction chamber are discharged into a direction tangent to said concave wall and perpendicular to said major axis, whereby fluid reactants enter said chamber, swirl past said inlet conduits and toward said exit means.

9. An apparatus for conducting controlled reactions of fluid reactants which comprises a reaction vessel having a reaction chamber enclosed by a first wall, a second wall and a concave wall extending from said first wall to said second wall, an exit means, multiple reactant inlet conduits projecting from said second wall into said reaction chamber, encompassing a major axis of said exit means and positioned so as to impart to fluid reactants issuing from said conduits a cocurrent swirling motion within said chamber, and at least one inlet conduit projecting from said first wall into said reaction chamber, said exit means being centrally positioned in relation to said first wall, spaced from and centrally positioned in relation to said second wall, and communicating with said reaction chamber, said concave wall encompassing said major axis, said inlet conduits passing through said second wall into said reaction chamber at positions intermediate said exit means and said concave wall.

10. A process for oxidizing a $C_1$ to $C_{25}$ hydrocarbon compound, which comprises mixing said compound with an oxygen-containing gas, continuously passing the resulting reactant mixture under pressure through multiple inlets at a linear gas velocity of about 10 to 5000 ft./second at a temperature of about 250° to 800° F. into a substantially cylindrical reaction zone a portion of which is heated to a temperature above the autoignition temperature of said reactant mixture, mixing reactant mixture and the reaction products thereof with the incoming reactant mixture by swirling said reacting mixture and reaction products past said inlets in a generally cocurrent movement, said movement being imparted to said reactant mixture and said reaction products by the continuous incoming passage of said reactant mixture through said inlets, and passing said reaction products from said reaction zone after a residence time therein of about 0.01 to 10 seconds.

11. A process for oxidizing a $C_1$ to $C_{25}$ organic compound, which comprises mixing said compound with an oxygen-containing gas, continuously passing the resulting reactant mixture under pressure through multiple inlets at a linear gas velocity of about 10 to 5000 ft./second and at a temperature of about 250° F. to 800° F. into a reaction zone a portion of which is heated to a temperature above the autoignition temperature of said reactant mixture until after said reaction is initiated, reacting said compound with said gas, swirling said reaction mixture and the resulting reaction products in a generally cocurrent movement past said inlets through the motion imparted to said reactant mixture and said reaction products by the continuous incoming passage of said reactant mixture through said inlets, and passing said reaction products from said reaction zone after a residence therein of about 0.01 to 10 seconds.

12. A process according to claim 11 wherein said organic substance is a hydrocarbon.

13. A process in accordance with claim 14 wherein said oxygen-containing gas is air.

14. A process according to claim 11 wherein the temperature of said reaction mixture passing through said inlets is lowered after the reaction is initiated.

15. A process according to claim 11 wherein said residence time is about 0.05 to 3.0 seconds.

16. A process according to claim 11 wherein said pressure is at least 5 p.s.i.g.

17. A process in accordance with claim 9 wherein said oxygen-containing gas is air.

18. A process for oxidizing a $C_1$ to $C_{25}$ organic compound, which comprises mixing said compound with an oxygen-containing gas, continuously passing the resulting reactant mixture through multiple inlets at a linear gas velocity of about 10 to 5000 ft./second and at a temperature of about 250° F. to 800° F. into a reaction zone, contacting said reactant mixture with a reaction initiation substance, reacting said compound with said gas, swirling said reactant mixture and the reaction products in a generally cocurrent movement past said inlets through the motion imparted to said reactant mixture and said reaction products by the continuous incoming passage of said reactant mixture through said inlets, and removing said reaction products from said reaction zone after a residence therein of about 0.05 to 10 seconds.

19. A process according to claim 18 wherein said reaction initiation substance is ozone.

20. A process for oxidizing a $C_1$ to $C_{25}$ organic compound, which comprises mixing said compound with an oxygen-containing gas, continuously passing the resulting reactant mixture through multiple inlets at a linear gas velocity of about 10 to 5000 ft./second and at a temperature of about 250° F. to 800° F. into a reaction zone, a portion of which is heated to a temperature above the autoignition temperature of said reactant mixture until after reaction is initiated, reacting said compound with said gas, swirling said reactant mixture and reaction products thereof in a generally cocurrent movement past said inlets with the motion imparted to said reactant mixture and said reaction products by the continuous incoming passage of said reactant mixture through said inlets, spiralling said reaction products toward an exit from said reaction zone at the vortex of said movement and cooling said reaction products to quench the reaction.

21. A process for oxidizing a $C_1$ to $C_{25}$ organic compound, which comprises mixing said compound with molecular oxygen, continuously passing the resulting reactant mixture under pressure through multiple inlets at a linear gas velocity of about 10 to 5000 feet per second and at a temperature of about 250° F. to 800° F. into a reaction zone a portion of which is heated to a temperature above the autoignition temperature of said reactant mixture until after said reaction is initiated, reacting said compound with said oxygen, swirling said reaction mixture and the resulting reaction products in unidirectional rotation past said inlets through the motion imparted to said reactant mixture and said reaction products by the continuous incoming passage of said reactant mixture through said inlets, and passing said reaction products from said reaction zone after a residence therein of about 0.01 to 10 seconds.

22. A process for oxidizing a $C_1$ to $C_{25}$ organic compound, which comprises mixing said compound with an oxygen-containing gas, continuously passing the resulting reactant mixture through multiple inlets at a linear gas velocity of about 10 to 5000 ft./second and at a temperature of about 250° F. to 800° F. into a reaction zone, contacting said reactant mixture with a reaction initiation substance, reacting said compound with said gas, swirling said reactant mixture and the reaction products thereof in a generally cocurrent movement past said inlets with the motion imparted to said reactant mixture and said reaction products by the continuous incoming passage of said reactant mixture through said inlets, spiralling said reaction products toward an exit from said reaction zone at the center of said movement and cooling said reaction products to quench the reaction.

References Cited in the file of this patent

UNITED STATES PATENTS

| Number | Name | Date |
|---|---|---|
| 2,706,740 | Barusch et al. | Apr. 19, 1955 |
| 2,725,344 | Fenske et al. | Nov. 29, 1955 |
| 2,726,255 | Walker et al. | Dec. 6, 1955 |
| 2,750,434 | Krejci | June 12, 1956 |
| 2,775,635 | Bearer | Dec. 25, 1956 |
| 2,808,422 | Ritter et al. | Oct. 1, 1957 |
| 2,823,243 | Robinson | Feb. 11, 1958 |
| 2,897,062 | Minarik | July 28, 1959 |